INVENTOR.
Romayne E. Holmes, Jr.
BY
Harness, Dickey & Pierce
ATTORNEYS.

Feb. 27, 1968  R. E. HOLMES, JR  3,370,679
DISC BRAKE WITH YIELDABLE SUPPORTING ELEMENT
Filed Oct. 5, 1966  4 Sheets-Sheet 3
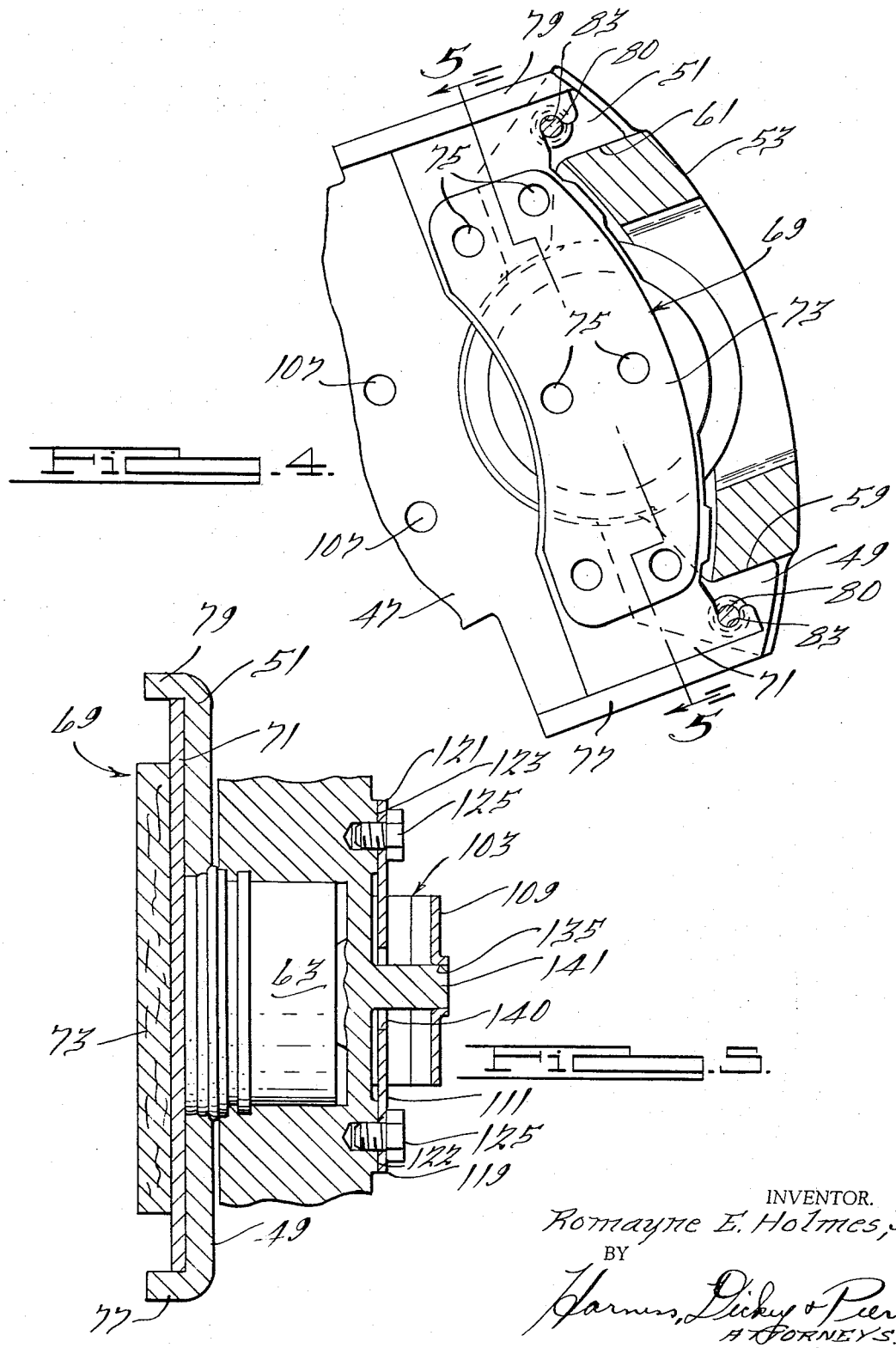
INVENTOR.
Romayne E. Holmes, Jr.
BY
Harness, Dickey & Pierce
ATTORNEYS.

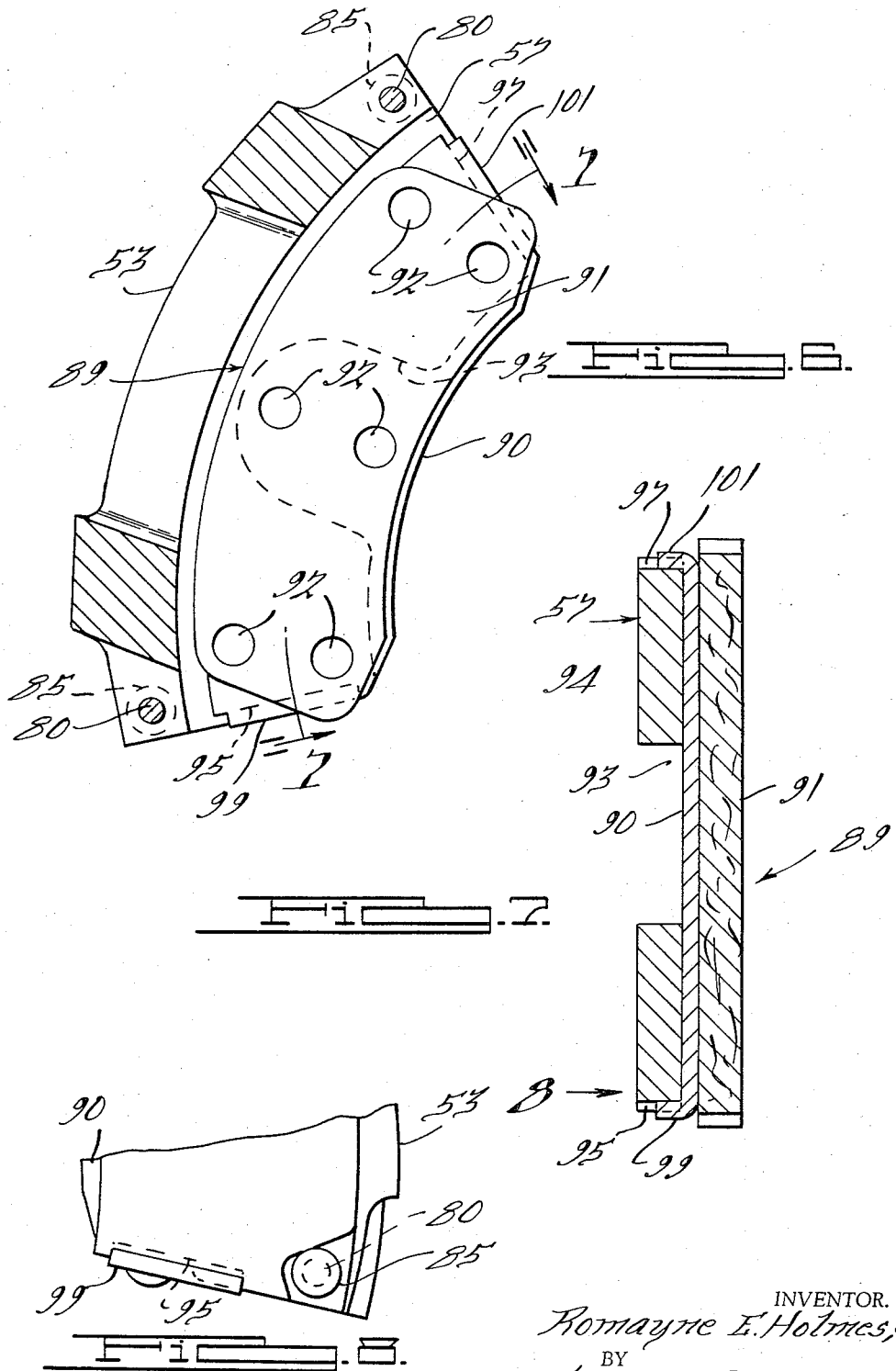

United States Patent Office 3,370,679
Patented Feb. 27, 1968

3,370,679
DISC BRAKE WITH YIELDABLE
SUPPORTING ELEMENT
Romayne E. Holmes, Jr., Madison Heights, Mich., assignor to Kelsey-Hayes Company, Romulus, Mich., a corporation of Delaware
Filed Oct. 5, 1966, Ser. No. 584,592
13 Claims. (Cl. 188—73)

ABSTRACT OF THE DISCLOSURE

A floating caliper type disc brake embodying a yieldable support for accommodating the sliding movement of the caliper. The caliper is provided with a boss that extends through an elongated aperture formed in an intermediate portion of the yieldable support for resisting twisting of the caliper upon engagement of the brake pads.

This invention relates to a disc brake including a housing or caliper supported on a stationary reaction member by a yieldable support, and more particularly to such a disc brake in which means are provided to prevent undesired movement of the disc brake including twisting as braking action occurs.

The disc brakes to which the present invention relates include those having a disc or rotor secured for rotation with the vehicle wheel and a caliper or housing embracing a portion of the rotor. A pair of brake shoes are non-rotatably supported on opposite sides of the rotor and are movable into frictional engagement with opposite parallel faces thereof. The brake includes a caliper having opposed legs lying on opposite sides of the rotor with one of the brake shoes being positioned adjacent one of the legs and with the other of the brake shoes being positioned adjacent the other of the legs. A piston carried by one leg of the caliper directly presses one brake shoe into frictional engagement with one face of the rotor. The caliper is movable in a generally axial direction so that the reaction force to the energization of piston biases the caliper in a direction to press the other brake shoe against the opposite face of the rotor.

In prior disc brakes of the type described above, a yieldable means has been employed to mount the housing or caliper on a fixed reaction or torque plate for movement in a plane generally perpendicular to the plane of rotation of the rotary disc. This yieldable means may have a fixed first portion that is coupled to the fixed reaction or torque plate that is adapted to be coupled to a vehicle in which the brake is mounted and a second portion remote from the first portion positioned in supporting engagement and baising the caliper housing of the brake in one direction. The braking torque of one of the brake shoes is transferred to the fixed reaction or torque plate and the braking torque of the other brake shoe is transferred to the housing or caliper. This structure while producing a satisfactory disc brake in many respects suffers from the disadvantage that it permits the housing including the caliper legs to twist due to the twisting couple produced on the housing or caliper when braking forces are applied to the rotor by means of brake shoes. It can be readily appreciated that this twisting of the housing or caliper may cause severe uneven and non-uniform wear of the brake shoes.

The present invention provides cooperating means on the housing and the yieldable means that supports the housing upon the fixed torque or reaction plate for preventing any twisting or cocking of the housing due to the above described twisting coupling thereby keeping the faces of the brake shoes in a parallel relationship with the faces of the rotor which they engage during braking action.

The invention also provides a reinforcing means on the yieldable means or strap for preventing undesirable movement of the caliper or housing in a direction transverse to the plane of rotation of the rotor or disc thereby preventing uneven wear of one of the brake shoes with respect to the other that might otherwise occur.

An object of the present invention is the provision of a disc brake having a housing or caliper supported on a torque plate by a yieldable means in which means are provided to prevent uneven wear of the brake linings that would otherwise occur due to the twisting couple applied to the housing or caliper during braking operations.

A further object of the invention is the provision of a disc brake which is compact and efficient and which includes a yieldable means supporting a caliper or housing on a fixed reaction or torque plate that includes cooperating means that cooperates with means on the housing for preventing twisting of the yieldable means and the caliper or housing during braking operations.

Another object of the invention is the provision of a disc brake having a housing or caliper supported on a fixed reaction or torque plate by a yieldable means having a reinforcing means which resists and prevents unwanted or undesirable movement of the housing or caliper in a direction transverse to the plane of rotation of the disc or rotor to be braked thereby preventing uneven wear of one brake shoe with respect to the other.

Other objects and advantages of the present invention will become more apparent from a consideration of the following detailed description taken in conjunction with the drawings in which:

FIG. 4 is a sectional view of FIG. 2 taken along the line 4—4 thereof;

FIG. 5 is a sectional view of FIG. 4 taken along the line 5—5 thereof;

FIG. 6 is a sectional view of FIG. 2 taken along the line 6—6 thereof;

FIG. 7 is a sectional view of FIG. 6 taken along the line 7—7 thereof;

FIG. 8 is a fragmentary view of FIG. 7 looking in the direction of the arrow 8.

Figure 1:
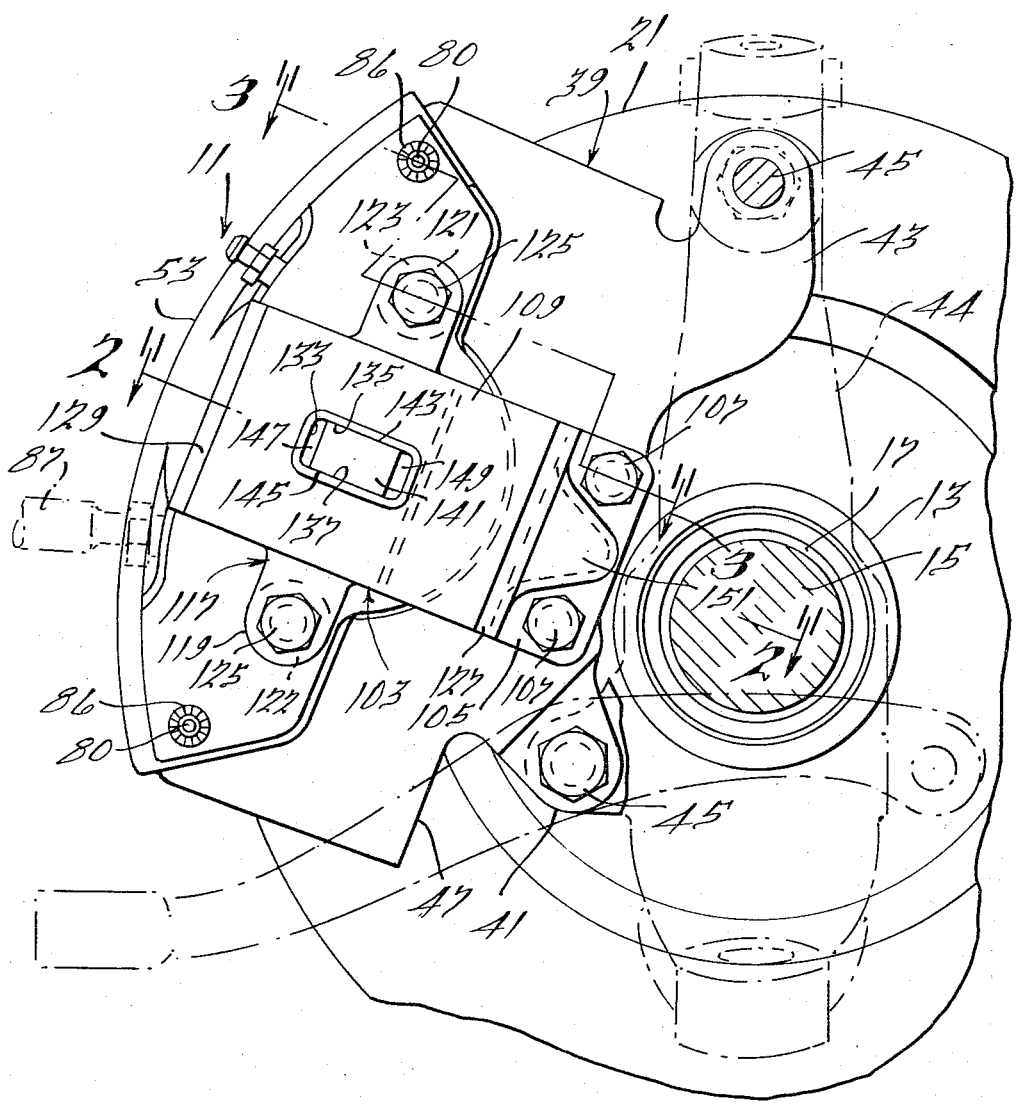
FIGURE 1 is an elevational view, partly in section, illustrating a typical installation of a disc brake embodying a preferred form of the present invention.
Figure 2:
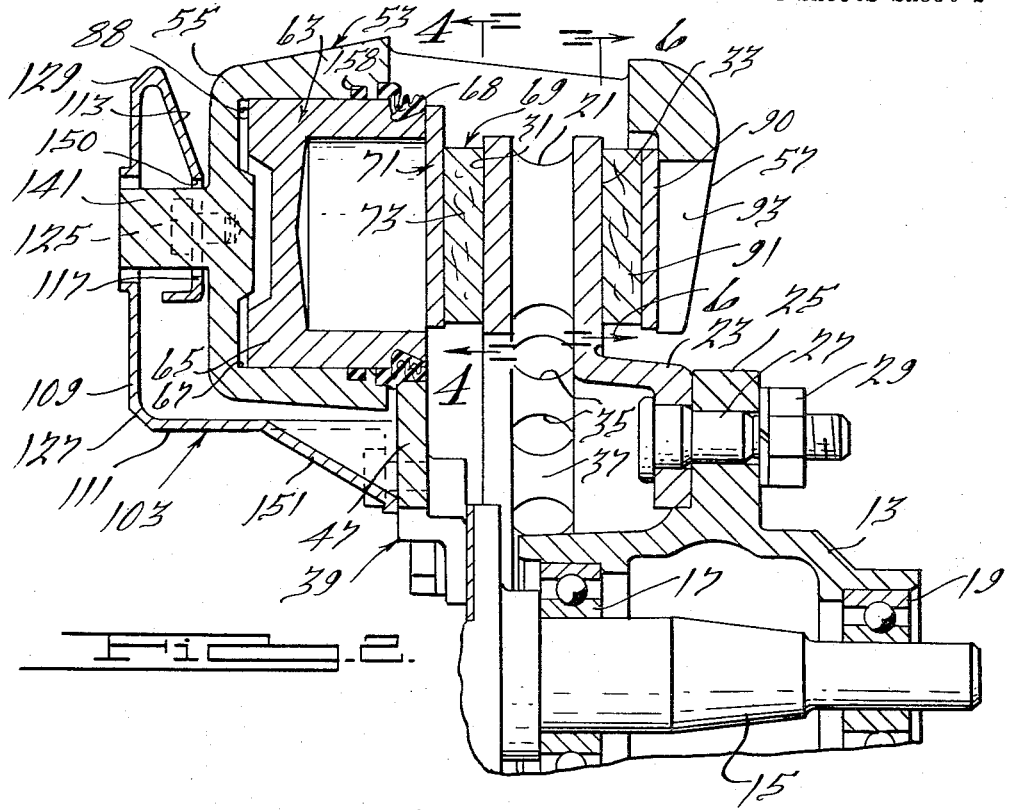
FIG. 2 is a sectional view of FIG. 1 taken along the line 2—2 thereof.

Referring now more specifically to the drawings, a disc brake embodying the present invention is illustrated generally at 11 in FIGS. 1 and 2 and is shown associated with a vehicle wheel assembly having a hub 13 rotatably supported on a stationary wheel spindle 15 by bearings 17, 19 and to which a conventional wheel rim (not shown) is adapted to be secured. A brake disc or rotor 21 is provided with an attaching flange 23 secured to a flange 25 on the hub 13 by bolts 27 and nuts 29, and it has a pair of oppositely disposed brake shoe engaging radial faces 31, 33. A plurality of radially extending openings 35 in the rotor 21 are spaced apart by webs 37 which serve as fan blades to move cooling air outwardly through the openings 35 during turning movement of the rotor 21.

A torque plate 39 has a pair of flange-like projections 41, 43 adapted to be fixed by screws 45 to a steering knuckle assembly 44 nonrotatably supported by the wheel spindle 15 through a conventional king pin arrangement (not shown) when the disc brake is associated with a vehicle front wheel. In the rear wheel version, the torque plate 39 may have flange means secured directly to a flange formed integrally with a stationary wheel spindle. The torque plate 39 has a web 47 offset from the projections 41, 43 and provided with a pair of spaced, outwardly extending torque arms 49, 51 integral therewith.

A generally C-shaped housing or caliper 53 is provided with generally opposed legs 55, 57 lying on opposite sides of the rotor 21 and which legs are disposed in spaced confronting relation to arcuate portions of the rotor faces 31, 33. The caliper is snugly but slidably received between opposed torque reaction faces 59, 61 on the torque arms 49, 51, respectively. A hydraulic motor 63 is carried by the caliper leg 55 and is seen to include a piston 65 slidably disposed in a cylinder bore 67 formed in the leg 55. A flexible boot 68 is fixed at its ends to the caliper leg 55 and the piston 65 to prevent contamination of the sliding piston and cylinder bore surfaces.

The outer end of the piston 65 is positioned to engage a brake shoe 69 including a backing plate 71 having brake lining 73 secured thereto by bonding or rivets 75 so that when the piston 65 moves toward the right, as seen in FIG. 2, the brake lining 73 is pressed into frictional engagement with the rotor face 31. The brake shoe 69 is prevented from turning with the rotor 21 by a laterally spaced pair of right-angle flanges 77, 79 on the torque plate 39 between which the brake shoe backing plate 71 is confined (FIGS. 4 and 5). A spaced pair of pins 80 extends through aligned openings 81, 82 at opposite ends of the caliper 53. Each pin 80 is received in a recess 83 in the backing plate 71 and extends through openings 84 in the torque arms 49, 51 aligned with the openings 81, 82 to position the brake shoe 69 during assembly. Each pin 80 has an enlarged head 85 at one end and has a spring washer 86 pressed on its other end to hold the pins 80 against longitudinal movement relative to the caliper 53.

The hydraulic piston 65 is moved toward the right, as seen in FIG. 2, by admitting pressurized fluid to the cylinder bore 67 behind the piston 65 through a conduit 87 connected to a passage 88 in the caliper leg 55. This fluid pressure biases the caliper 53 toward the left as seen in the figure and through the caliper leg 57, which is the reaction portion of the brake, presses a brake shoe 89 against the rotor 21.

As seen best in FIGS. 6–8, the brake shoe 89 includes a backing plate 90 seated against a flat surface 94 on the caliper leg 57 and having brake lining 91 secured thereto by bonding in the usual manner or by rivets 92. The caliper leg 57 is centrally apertured at 93 to reduce the overall weight of the device and has a pair of slots 95, 97, one at either side thereof, to snugly receive right angle flanges 99, 101, respectively, on either end of the backing plate 90. Thus, when the caliper 53 and the brake shoe 89 are biased toward the left, as seen in FIG. 2, the brake lining 91 is pressed into frictional engagement with the rotor face 33 and acts conjointly with the lining 73 of brake shoe 69 to slow or stop the vehicle wheel.

As set forth hereinabove, it is necessary that the motivating forces pressing brake linings 73, 91 of shoes 69, 89 into frictional engagement with the rotor faces 31, 33 act perpendicular to the faces 31, 33 of the rotor 21 or as near as possible thereto to insure the desirable brake lining wear pattern. Furthermore, the motivating forces must continue to act in this manner as the brake linings 73, 91 become worn and the position of the caliper 53 should be adjusted relative to the rotor to take up slack resulting from lining wear in order that the pedal travel required to effect braking remains substantially constant.

Figure 3:
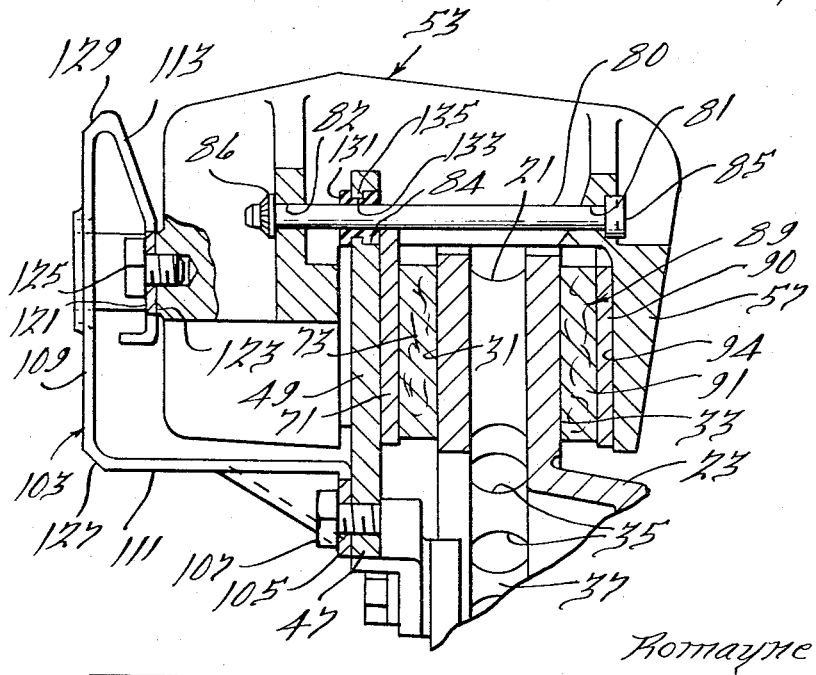
FIG. 3 is a sectional view of FIG. 1 taken along the line 3—3 thereof.

Accordingly, a flexible strap 103 supports the caliper 53 relative to the rotor 21 in the desired manner, as shown in FIGS. 1–3. The strap 103 has an inner radial flange 105 affixed to the torque plate web 47 by screws 107. A laterally offset arm 109 is positioned in a plane generally parallel to the plane of rotation of the disc 21 and the planes defined by the brake shoe engaging faces 31 and 33, and is disposed in spaced confronting relationship to the caliper leg 55. It has one end connected with the flange 105 by a perpendicularly positioned web 111 and the other end connected to a reversely bent spring finger or arm 113 that tapers inwardly from the arm 109 and forms an acute angle therewith. The finger or arm 113 has an angled terminal end 117 positioned in a plane generally parallel to laterally offset arm 109. This angled terminal end 117 has outwardly extending extensions 119 and 121 which bear flat against seats 122 and 123 on the caliper 53 and are fixed thereto by screws 125.

The strap 103 has reduced thickness areas 127 and 129 between the web 111 and the arm 109 and between the arm 109 and the inwardly extending finger or arm 113, respectively, thereby forming a pair of parallel spaced solid state hinges with pivot axes about which the arm 109 can pivot relative to the web 111 and about which the finger or arm 113 can pivot relative to the arm 109.

The arm 109 has a rectangular aperture 133 positioned therein that has paralled spaced side walls 135 and 137. The longitudinal axis of the aperture 133 is positioned along the neutral axis of the flexible strap 103 which, it can be readily appreciated, is positioned midway between the screws 125, midway between the screws 107 and along the section line 2—2 shown in FIG. 1. A rectangular boss 141 is integrally formed with, or otherwise suitably fixed to, the leg 55 of the caliper 53, and it has side walls 143 and 145 positioned in a sliding fit engagement with the spaced side walls 135 and 137, respectively, of the rectangular aperture 133 positioned in the arm 109. The longitudinal axis of the rectangular boss 141 is also positioned along the neutral axis of the flexible strap 103 and along the section line 2—2 of FIG. 1.

The transverse axes of the rectangular boss 141 and the rectangular aperture 133 are positioned along a line extending between the centers of the screws 125 that attach the flexible finger or arm 113 to the fluid motor portion 55 of the caliper 47. This relationship can be seen by reference to FIGS. 1 and 5. The center of the rectangular boss 141 and the center of the rectangular aperture 133 are also positioned substantially along the center line of the piston 65 of the fluid motor 63. This relationship can be seen by reference to FIG. 2.

It will be noted from an inspection of FIGS. 1 and 2 that spaces 147 and 149 are provided between the end walls of rectangular boss 141 and the end walls of the aperture 133 to permit the caliper 53 to move with respect to the arm 109 in a radial direction with respect to the axis of the spindle 15 or in a vertical direction as viewed in FIG. 2. As shown in FIG. 2, the angled terminal end 117 has a central clearance aperture 150 through which the rectangular boss protrudes.

An integrally formed reinforcement strut or flange 151 is positioned between the web 111 and the inner radial flange 105 of the yieldable strap 103. This reinforcing strut or flange is positioned midway between the two attaching bolts 107 and prevents flexing of the strap 103 about the right angle connection between the web 111 and the flange 105. The reinforcing strut or flange 151 prevents any unwanted or undesirable movement of the caliper 53 in a direction transverse to the faces 31 and 33 of the rotor 21 thereby preventing uneven wear of the brake shoes 73 and 91 with respect to each other that might otherwise occur.

When the parts are assembled, the flexible strap 103 is stressed to act in a spring-like manner to bias the caliper 53 toward the left, as seen in FIGS. 2 and 3. This causes the brake lining 91 of the shoe 89 to normally engage the rotor face 33. In a conventional vehicle installation having new brake linings, the lining 91 engages the face 33 under a force of about 40 pounds. With a coefficient of friction of about 0.35 and a mean radius of the braking surface of about 4.5 inches, this results in a torque of about 60 inch-pounds, which is well within the accepted range. Even at prolonged high speed driving and with new brake linings, the temperature increase of the rotor 21 will not exceed about 40° F.

With this construction, when the hydraulic motor 63 is pressurized, the piston 65 moves toward the right, as seen in FIG. 2, and presses the lining 73 of brake shoe 69 into frictional engagement with the rotor face 31. The reaction to motor pressurization biases the caliper 53 toward the left and increases the frictional engagement between the lining 91 of brake shoe 89 and the rotor face 33. The only caliper movement occurring here is that necessary to increase the frictional contact between the lining 91 and the rotor face 33 and is quite small. When the fluid pressure to the motor 63 is released, the piston 65 backs off slightly to release the lining 73 of brake shoe 69 from tight engagement with the rotor face 31 and the caliper 53 is released so the the lining 91 of brake shoe 89 engages the rotor face 33 solely under the spring force of the flexible strap 103.

An annular seal 158 carried within the cylinder bore 67 sealingly engages the piston 65 and has a generally rectangular cross-sectional configuration so that when the piston 65 moves toward the right during brake application, the seal 158 is twisted or distorted. Thus, when the fluid pressure to the motor 65 is released, the seal 158 springs back slightly and releases the lining 73 of brake shoe 69 from tight engagement with the rotor face 31.

As the brake lining 91 becomes worn, the spring-like flexible strap 103 automatically shifts the caliper 53 toward the left as seen in FIGS. 2 and 3 and keeps the lining 91 of brake shoe 89 in contact with the rotor face 33, the contact force between the lining 91 and the face 33 becoming progressively less as the caliper 53 moves in this direction. As the caliper 53 undergoes this movement, the strap arm 109 swings in a counterclockwise direction about the hinge area 127 while the finger or arm 113, swings in a counterclockwise direction about the hinge areas 129. The strap arm 109 and finger or arm 113 are preloaded by elastically bending them in a clockwise direction about these hinge areas so that they move under this elastic loading in a counterclockwise direction as the lining 91 wears.

The spring-like pivotal force exerted on the finger or arm 113, at the hinge area 129 and the pivotal force exerted on the arm 109 at the hinge area 127 are such that as the caliper 53 moves with wear of the lining 91, the axis of the cylinder bore 67 remains perpendicular to the rotor faces 31, 33 and the surface 94 on the caliper leg 57 against which the backing plate 90 of brake shoe 89 is seated remains parallel to these faces 31, 33. In order to achieve this, the elastic spring force on the arm 109 which pivots the arm 109 about the hinge area 127 is slightly greater than the elastic spring force tending to pivot the finger or arm 113, about the hinge area 129. This is due to the greater length of the arm 109 as compared with the finger or arm 113. This insures that the brake shoe motivating forces always act normal to the rotor faces 31, 33. Of course, if the lengths of the arm 109 and the arm finger 113 were equal or if the arm 109 was shorter than the arm or finger 113, the spring force on the arm 109 should be equal to or less than the spring force on the arm or finger 113 accordingly.

Thus, as the lining 91 gradually becomes worn, the caliper 53 shifts toward the left as seen in FIG. 2 and keeps the lining 91 always in engagement with the rotor face 33. The lining 73 of brake shoe 69 remains close to or lightly engaging the rotor face 31 and the piston 65 is not knocked back or toward the left within the cylinder bore 67 so that in this way, the pressurization of the motor 63 and therefore pedal travel needed to energize the brakes is indeed small and remains relatively constant. In addition, the spring-like action of the strap 103 and the light contact between the linings 73, 91 and the rotor faces 31, 33 keeps these parts from vibrating and rattling. Significantly, because of the maintained orientation of the caliper 53 relative to the rotor faces 31, 33, the resulting wear pattern on both linings 73, 91 is good and the brake lining life is maximized. As the caliper 53 shifts during wear of the lining 91, the caliper moves slightly in a radial direction relative to the rotor 21. This movement however, does not affect braking operations, because it has a very small magnitude and because the radial dimension of the rotor faces 31, 33 is slightly greater than that of the linings 73, 91 to allow a small amount of relative radial movement therebetween.

Another feature of the present invention is the connection between the caliper 53 and the torque plate 47 provided by the pins 80. Thus, the pins 80 are prevented from movement relative to the caliper 53 by the pin heads 85 and the spring washers 86. A resilient grommet 131 is in snug, surrounding relation to each of the pins 80 and each has an annular groove 133 in its outer surface receiving an annular flange 135 on the torque arms 49, 51 adjacent the openings 84 (FIG. 3). The grommets 131 normally frictionally hold the pins 80 against axial movement relative to the torque plate 47 and overcome, for example, centrifugal forces tending to move the caliper 53 in a direction normal to the rotor faces 31, 33 when the vehicle wheel (not shown) is turned during cornering. This prevents the caliper 53 from bearing inboard or toward the left as seen in FIG. 2 which would cause undesirable frictional engagement between the lining 91 and the rotor face 33 and premature wear of this lining and excessive rotor heating. In addition, the grommets 131 afford an additional cushioned support for the caliper 53 maintaining its orientation relative to the rotor 21 against sharp blows as when the vehicle wheel (not shown) hits a bump and provides a rattle-free construction for these parts.

Furthermore, and perhaps most importantly, the caliper 53 is prevented from moving outboard or toward the right as seen in FIG. 2 under centrifugal forces acting thereon in this direction. Were this caliper movement not prevented, greater piston travel and correspondingly greater pedal travel would be necessary to effect braking on the rotor 21. The frictional gripping forces exerted by the grommets 131 on the pins 80 are overcome by the spring-like force exerted by the flexible strap 103 on the caliper 53 so that the lining 91 of brake shoe 89 is always seated lightly against the rotor surface 33.

During braking, frictional forces between the rotor face 33 and the brake lining 91 and between the rotor face 31 and the brake lining 73 create a torque couple tending to twist the caliper 53 relative to the torque plate 39. This torque couple is created because the braking force absorbed by the brake lining 91 is transferred to the leg 57 of caliper 53 via the right angle flanges 99 and 101 positioned on the backing plate 90 and then to the torque plate 39 via the opposed torque reaction faces 59 and 61 on the torque arms 49 and 51, while the braking force absorbed by the brake lining 73 is transferred directly to the torque plate 39 via the ends of backing plate 71 that are engageable with the flanges 77 and 79 on the torque plate arms 49 and 51. It can be appreciated that this torque couple tends to twist the caliper 53 in a plane generally perpendicular to the plane of rotation of the rotary disc 21 and to the planes defined by the rotor faces 31 and 33 and this twisting would normally result in uneven wear of the ends of one or both of the brake linings 73 and 91. In addition, it may create an undesirably large servo action in the brake.

In the present invention, however, this twisting is prevented by the structure previously described including the rectangular boss 141 that is formed integrally or otherwise suitably affixed to the caliper 53 in cooperation with the side walls 135 and 137 of the aperture 133 positioned in the arm 109 of the flexible strap 103.

As previously explained, the longitudinal center lines of the boss 141 and the slot 133 are positioned on a line that extends radially outwardly from the center of the spindle 15 and that it is positioned precisely half-way between the positions of attachment, as determined by the screws 125, of the angled terminal end 117 of the strap 103 to the fluid motor portion 55 of the caliper 53. As a result, the forces that tend to twist the caliper about the torque plate 39 during braking action are resisted by the side walls 143 and 145 of the boss 141 engaging the side walls 135 and 137, respectively, of the rectangular aperture 133 positioned in the arm 109 of the flexible strap 103.

It should be realized that the longitudinal center lines of the boss 141 and the aperture 133 which lie along the section line 2—2 of FIG. 1 are positioned on the neutral axis of the flexible strap 103 with respect to the above-mentioned torque couple. Therefore, when this torque couple tends to twist the caliper 53 about this neutral axis, the side walls 143 and 145 of the boss 141 which are spaced equally from this neutral axis, engage the side walls 135 and 137 of the aperture 133, thereby preventing any such twisting about this neutral axis.

More specifically, it can be appreciated that the boss 141 having the side walls 143 and 145 positioned in engagement with the side walls 135 and 137 of the aperture 133 prevents any relative twisting action between the arm 109 and the finger or arm 113 and the integrally formed angled terminal end 117 of the flexible strap 103, since the angled terminal end portion 117 is affixed to the end wall of the fluid motor portion 55 by means of the screws 125 and the arm 109 is also operatively coupled to the end wall of the fluid motor portion 55 with respect to any twisting action brought about by the torque couple through the boss 141 and the side walls 135 and 137 of the aperture 133.

Positioning the centers of the rectangular boss 141 and the rectangular aperture 133 along the center line of the piston 65 of the fluid motor 63 provides the advantage that the resultant braking forces transferred to the caliper leg 57 and to the torque plate 39 also pass in close proximity to this center line thereby minimizing any twisting action that may occur other than through a plane perpendicular to the plane of rotation of the rotary disc 31.

The reinforcing strut or flange 151 positioned between the web 111 and the radial flange 105 of the yieldable strap 103 aids in preventing any twisting action between the flange 105 that is directly attached to the torque plate 39 and the web 111 that is affixed to the laterally offset arm 109 through the integrally formed solid state hinge 127.

Another inherent advantage of the present invention resides in the ease with which it can be assembled and disassembled to a vehicle wheel. Thus, the disc brake 11 may be fully assembled and secured to the torque plate 47 when shipped and all that is needed to install the brake on a vehicle wheel is to fasten the torque plate 47 to the steering knuckle or other nonrotating vehicle component by the screws 45. This is highly advantageous in that the time and skill required of the workman to mount the disc brake 11 is significantly small and consistent results are attained.

The present invention thus provides a compact and efficient structure that yieldably supports a disc brake caliper on a fixed torque plate for movement in a direction generally perpendicular to the plane of rotation of the disc to be braked and to the brake shoe engaging faces of this disc while simultaneously preventing twisting or other undesirable movement of the caliper that would otherwise result in uneven or nonuniform brake lining wear or undesirably large servo action of the brake.

By the foregoing, there has been disclosed a highly improved disc brake calculated to fulfill the inventive objects set out and while a preferred embodiment of the present invention has been illustrated and described in detail, various additions, substitutions, modifications and omissions may be made thereto without departing from the spirit of the invention as encompassed by the appended claims.

What is claimed is:

1. A disc brake for braking a rotary disc including a stationary torque plate disposed generally parallel to the disc, a caliper held against rotation by said torque plate and having a fluid motor portion on one side of the disc and a reaction portion on the other side of the disc, a first brake shoe disposed on one side of the rotary disc, said first brake shoe motivated by said fluid motor, a second brake shoe disposed between the other side of said disc and said reaction portion and motivated by said reaction portion, means coupling one of said brake shoes and said torque plate for transferring the braking torque of said one of said brake shoes to said torque plate, means coupling the other of said brake shoes and said caliper for transferring the braking torque of the other of said brake shoes to the caliper, the engagement of said brake shoes with the disc being effective to generate a torque couple tending to rotate said caliper relative to said torque plate in a plane extending perpendicular ot the disc, yieldable means having a first end portion fixed to said torque plate and a second end portion carrying said caliper for movement generally perpendicular to said disc, said yieldable means having an intermediate portion spaced from said caliper, and interengaging abutment means on said caliper and said intermediate portion of said yieldable means extending substantially perpendicularly to the disc for preventing twisting of said yieldable means and for resisting rotation of said caliper due to the twisting couple produced when said brake shoes engage said rotary disc during braking operations.

2. The combination of claim 1 in which said intermediate portion of said yieldable means is positioned in spaced relationship from the side of the fluid motor portion-opposite the disc.

3. The combination of claim 2 in which said yieldable means comprises a strap and in which said intermediate portion is positioned in a plane generally parallel to the plane of rotation of said disc.

4. The combination of claim 3 in which said interengaging abutment means comprises an extension carried by said side of said fluid motor portion and extending in a direction generally perpendicular to said disc and means forming a complementary shaped aperture in said intermediate portion of said strap.

5. The combination of claim 4 in which said extension comprises a boss and said boss and said aperture are positioned on the neutral axis of said yieldable strap with respect to the twisting couple produced when said brake shoes engage said rotary disc during braking operations.

6. The combination of claim 5 in which said boss and said aperture are rectangular in cross section and the longitudinal axes thereof are positioned parallel to said neutral axis and in which said neutral axis and said longitudinal axes lie in a plane perpendicular to the plane of rotation of said rotary disc.

7. The combination of claim 6 in which said fluid motor portion of said caliper comprises a fluid operated piston and the centers of said boss and said aperture are positioned substantially on the centerline of said fluid operated piston.

8. The combination of claim 1 in which said interengaging abutment means comprises an extension carried by said caliper and means defining a complementary shaped aperture in said intermediate portion of said yieldable means receiving said extension.

9. The combination of claim 8 in which said extension comprises a boss and said boss and said aperture are positioned on the neutral axis of said yieldable means with respect to the twisting couple produced when said brake shoes engage the rotary disc during braking operations.

10. The combination of claim 9 in which said boss and said aperture are rectangular in cross section and the longitudinal axes thereof are positioned parallel to the neutral axis of said yieldable means and in which said neutral axis and said longitudinal axes lie in a plane perpendicular to the plane of rotation of said rotary disc.

11. The combination of claim 10 in which said fluid motor portion of said caliper comprises a fluid operated piston and the centers of said boss and said aperture are positioned substantially on the center line of said fluid operated piston.

12. The combination of claim 1 in which said yieldable means comprises a yieldable strap and said first end portion fixed to said torque plate extends in a direction generally parallel to said torque plate, said intermediate portion spaced from said caliper extends in a plane generally parallel to said torque plate and to the disc, said intermediate portion and said first end portion are connected by a web extending in a plane generally perpendicular to said torque plate and the disc and in which a reinforcing strut couples said web portion and said first portion to prevent twisting between said first end portion and said intermediate portion and also prevents angular movement between said intermediate portion and said first end portion in a plane generally perpendicular to said torque plate and said disc.

13. The combination of claim 12 in which said first end portion of said yieldable strap is attached to said torque plate by a pair of spaced fastening means and said second portion of said yieldable strap is connected to said caliper by a pair of spaced fastening means and in which said caliper has a boss extending in a direction generally perpendicular to the torque plate and the disc and is in engagement with the side walls of an aperture positioned in said intermediate portion of said yieldable strap with said aperture and said boss being positioned along the neutral axis of said yieldable strap which is positioned midway between said first mentioned pair of spaced fastening means and midway between said second mentioned pair of spaced fastening means.

References Cited

UNITED STATES PATENTS 3,299,991   1/1967   De Castelet _____ 188—73

FOREIGN PATENTS 926,992   5/1963   Great Britain.

MILTON BUCHLER, *Primary Examiner.*

G. E. HALVOSA, *Examiner.*